O. S. YOHN.
TIRE.
APPLICATION FILED APR. 21, 1920.

1,363,300. Patented Dec. 28, 1920.

O. S. Yohn, Inventor

Witness

UNITED STATES PATENT OFFICE.

OLIVER S. YOHN, OF NEW YORK, N. Y.

TIRE.

1,363,300.

Specification of Letters Patent. Patented Dec. 28, 1920.

Application filed April 21, 1920. Serial No. 375,564.

*To all whom it may concern:*

Be it known that I, OLIVER S. YOHN, a citizen of the United States, residing at New York, in the county of New York and State of New York, have invented a new and useful Tire, of which the following is a specification.

The device forming the subject matter of this application is a tire and one object of the invention is to provide an article of the kind alluded to which will resist puncture and wear. Another object of the invention is to provide a tire which will not skid on a smooth surface or sink unduly in mud or sand.

It is within the province of the disclosure to improve generally and to enhance the utility of devices of that type to which the invention appertains.

In the drawings I have illustrated but one form which the invention may take, but it is to be understood that, within the scope of what is claimed, a tire builder, resorting to the skill of his calling, may work changes in the precise form depicted and described, without departing from the spirit of the invention, it being unnecessary and impractical to delineate all possible forms of the invention, since one form will suffice to instruct those skilled in the art.

Figure 1:
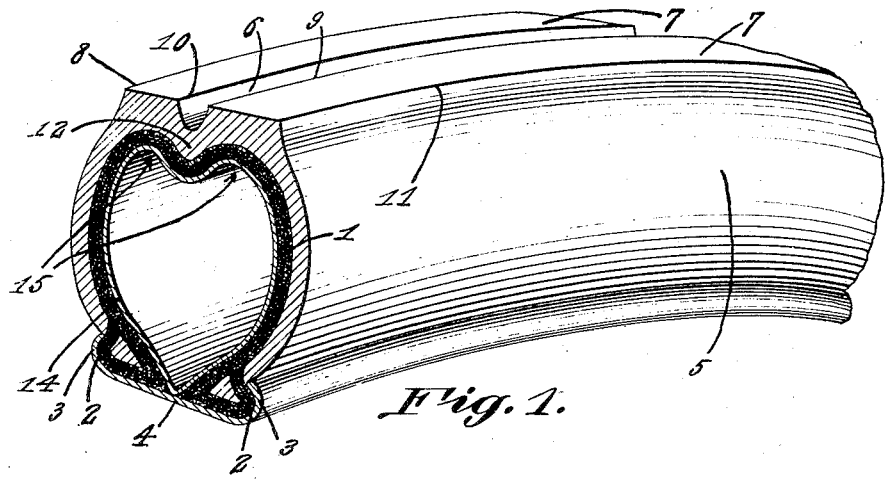
Figure 1 is a sectional perspective showing the tire.
Figure 2:
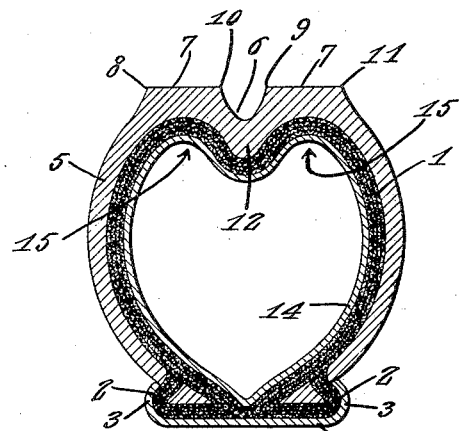
Fig. 2 is a cross section.
Figure 3:
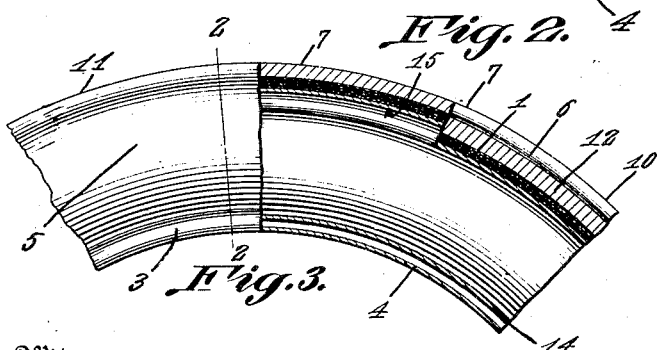
Fig. 3 shows in side elevation, a tire constructed in accordance with the invention, sundry parts being broken away, and other parts appearing in section.

The tire forming the subject matter of this application may be made from any desired materials or combination of materials, since, as I am aware, materials of construction are not ordinarily taken into consideration in weighing the patentable novelty of an invention. The tire, therefore, may be said to comprise a casing including a body 1 having beads 2 adapted to engage the clencher flanges 3 of a rim 4. The salient features of the invention may form part of a tire other than a clencher tire and, therefore, the use of the beads 2 and the flanges 3 is by no means mandatory. The body portion 1 of the casing may be of multi-ply canvas construction and may carry a shoe 5 of commercial rubber or any other suitable substance.

The shoe 5 is provided in its periphery with a circumferential groove 6 defining treads 7 coöperating with the side surfaces of the shoe 5, and with the wall of the groove 6, to define edges 8, 9, 10 and 11. The shoe 5 and the body 2 are extended inwardly, in the median plane of the tire, and in alinement with the groove 6, to form an internal rib 12. An inflatable tube 14 is located within the casing and is flexed across the rib 12 to form circumferential chambers 15, disposed in common planes with the treads 7, circumferentially of the tire. It is to be understood that the groove 6 is not adapted or intended to receive a chain or like element. The rib 12 results because the tire casing is so built as to form the rib, and not because there is any distortion of the casing, due to the presence of a chain in the groove 6.

Owing to the fact that the casing includes the internal circumferential rib 12, the tube 14 is so shaped, as indicated at 15, that support is afforded in alinement with the treads 7. The casing not only has a duplex tread, but the tube 14, as well, is given a duplex form.

Since the tread consists of two parallel parts, separated by the groove 6, the tire will not sink into mud or sand to the extent resulting when a tire of different form encounters like conditions.

The tire is peculiarly effective in preventing side skidding. Thus, a tendency to skid in one direction will be nullified by the edges 8 and 9, a tendency to skid in an opposite direction being nullified by the edges 10 and 11.

The device forming the subject matter of this application is singularly free from liability to puncture. It is a matter of common knowledge that a large proportion of punctures occur at or close to the median plane of a tire. The groove 6 is located in the median plane, the tire being supported on the treads 7, and, as a consequence, a nail or the like which may lie on the ground close to the median plane of the tire will simply be received in the groove 6, without entering the tire. The tire is so built and constructed that there is an ample thickness of material at the treads 7, punctures being avoided. Further, owing to the fact that the rib 12 is present, a nail or the like entering the tire casing at an angle to the vertical, will pass into the rib 12, as distinguished from making perforations of sufficient depth to tap the tube 14.

It is to be observed that since the casing is provided with the groove 6, there is no wear on the tread in the median plane, the durability of the structure being promoted accordingly.

The casing is so constructed that the manufacturer may increase the proportions of the walls at points of contact and wear. The inner tube is so positioned that it reinforces itself, the strain on the tube being divided.

Owing to the particular cross section of the tire, the inner tube is held in place and friction between the inner tube and the casing is lessened, it being well known that when a car rocks, there is considerable friction between the tube and the casing, in a tire as ordinarily constructed. Further, the strain on the inner tube is reduced. Thus, when, for example the tire passes over an obstruction, encountered relatively close to the edge 8, the rib 12 will serve to relieve the inner tube from strain, and particularly from strain due to a lateral yielding of the casing. The puncturable surface is reduced. Owing to the provision of the groove 6, that portion of the tire which, ordinarily, is most liable to puncture is, in substance, elevated out of contact with the roadway. A nail or the like, entering the casing at almost any angle is compelled to pass through a large amount of material before reaching the inner tube. The device has an increased frictional hold on the surface of soft roads, the constituent material of the road entering and conforming to the shape of the groove 6. The result is, that not only side skidding but backward and forward skidding, as well, is reduced to a minimum or avoided entirely.

What is claimed is:—

A tire casing provided in its periphery with an open and unencumbered circumferential groove defining circumferentially continuous parallel treads, the casing having an internal circumferential rib alined with the groove and serving to render the casing of substantially the same thickness at the base of the groove as upon each side of the groove.

In testimony that I claim the foregoing as my own, I have hereto affixed my signature in the presence of two witnesses.

OLIVER S. YOHN.

Witnesses:
C. E. KING,
W. W. BRITSCH.